United States Patent
Kanugo (10) Patent No.: US 9,846,410 B2
(45) Date of Patent: Dec. 19, 2017

(54) HOLOGRAPHIC DISPLAY SYSTEMS AND METHODS HAVING ELLIPOSIDIAL ARRANGMENT OF DMD ARRAYS EMITTING INFRARED LASER RADIATION

(75) Inventor: Kapil Kanugo, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 82 days.

(21) Appl. No.: 13/976,668

(22) PCT Filed: Sep. 14, 2011

(86) PCT No.: PCT/US2011/047924
§ 371 (c)(1),
(2), (4) Date: Jun. 27, 2013

(87) PCT Pub. No.: WO2013/039465
PCT Pub. Date: Mar. 21, 2013

(65) Prior Publication Data
US 2013/0271800 A1      Oct. 17, 2013

(51) Int. Cl.
*G03H 1/22* (2006.01)
*H04N 13/04* (2006.01)
(Continued)

(52) U.S. Cl.
CPC ....... *G03H 1/2294* (2013.01); *G02B 27/2292* (2013.01); *H01S 3/1022* (2013.01);
(Continued)

(58) Field of Classification Search
CPC .......................... G02B 27/22; G02B 27/2271; G02B 27/2278; G02B 27/2292; G03H 1/22;
(Continued)

(56) References Cited

U.S. PATENT DOCUMENTS 4,901,330 A * 2/1990 Wolfram et al. ............... 372/75
5,418,805 A   5/1995 Zhiglinsky et al.
(Continued)

FOREIGN PATENT DOCUMENTS

CN   101460895 A   6/2009
EP   1514428 A2    3/2005
(Continued)

OTHER PUBLICATIONS

International Preliminary Report on Patentability and Written Opinion received for PCT Patent Application No. PCT/US2011/047924, dated Mar. 27, 2014, 5 pages.
(Continued)

*Primary Examiner* — Stephone B Allen
*Assistant Examiner* — Ryan S Dunning
(74) *Attorney, Agent, or Firm* — Jordan IP Law, LLC (57) ABSTRACT

Systems, devices and methods are described including providing infrared (IR) laser radiation to a Digital Micromirror Device (DMD) array and using the DMD array to spatially modulate the IR laser radiation. The spatially modulated IR laser radiation may then be projected to form a voxel array where each voxel of the array represents to a volume of air wherein the IR laser radiation has been focused sufficiently to cause air to ionize. The voxel array may then be spatially rotated.

12 Claims, 6 Drawing Sheets

(51) Int. Cl.
G02B 27/22 (2006.01)
H01S 3/102 (2006.01)
H01S 3/0941 (2006.01)
H01S 3/16 (2006.01)
H01S 3/00 (2006.01)

(52) U.S. Cl.
CPC ..... *H04N 13/0427* (2013.01); *H04N 13/0495* (2013.01); *H01S 3/005* (2013.01); *H01S 3/09415* (2013.01); *H01S 3/1611* (2013.01); *H01S 3/1643* (2013.01)

(58) Field of Classification Search
CPC ......... G03H 1/2286; G03H 2001/2292; G03H 2210/40; G03H 2210/42; G03H 2210/44; G03H 2222/16; G03H 2222/36
USPC ...... 359/1, 9, 10, 11, 15, 17, 18, 22, 27, 28, 359/35
See application file for complete search history.

(56) References Cited

U.S. PATENT DOCUMENTS

| | | | |
|---|---|---|---|
| 5,457,493 A | 10/1995 | Leddy et al. | |
| 5,754,147 A * | 5/1998 | Tsao et al. | 345/6 |
| 6,128,078 A | 10/2000 | Fateley | |
| 6,577,411 B1 * | 6/2003 | David | 359/19 |
| 6,857,746 B2 | 2/2005 | Dyner | |
| 7,766,485 B2 | 8/2010 | Momiuchi et al. | |
| 2002/0163482 A1 | 11/2002 | Sullivan | |
| 2005/0068999 A1 | 3/2005 | Momiuchi et al. | |
| 2007/0242237 A1 * | 10/2007 | Thomas | G02B 27/225 353/94 |
| 2009/0179852 A1 | 7/2009 | Refai et al. | |
| 2009/0213340 A1 * | 8/2009 | Momiuchi et al. | 353/62 |
| 2009/0284489 A1 * | 11/2009 | Batchko | 345/173 |
| 2010/0165301 A1 | 7/2010 | Kojima et al. | |
| 2010/0321478 A1 * | 12/2010 | Sliwa | G02B 27/2271 348/51 |

FOREIGN PATENT DOCUMENTS

| | | |
|---|---|---|
| JP | 2007508596 A | 4/2007 |
| WO | 2013/039465 A1 | 3/2013 |

OTHER PUBLICATIONS

Dudley, et al., "Emerzing Digital Micormirror Device Applications", SPIE Proceedings vol. 4985, 2003, 12 Pages.
International Search Report and Written opinion for PCT Patent Application No. PCT/US2011/047924 dated Mar. 19, 2012, 8 Pages.
Raul Barreto, "Using DLP® Development Kits for 3D Optical Metrology Systems", Texas Instruments Application Report DLPA026-May 2011, 18 Pages.
Segal, et al., "The OpenGL® Graphics System: A Specification", Version 4.1 (Core Profile), Jul. 25, 2010, 518 Pages.
Texas Instruments, "Single-Panel DLPTM Projection System Optics", Texas Instruments Application Report, Discovery DLPA002—Mar. 2005, 32 Pages.
Texas Instruments Incorporated, "DLP Pico Chipset v2 Programmer's Guide", Literature No. DLPU002A, Revised Jul. 2010, 45 Pages.
Texas Instruments Incorporated, "DLP® Pico Projector Development Kit V2", User's Guide DLPU003A, Revised Dec. 2010, 21 Pages.
Texas Instruments Incorporated, "DLPC200 API Programmer's Guide", DLPA014B—Jul. 2010—Revised Mar. 2011, 15 Pages.
Extended European Search Report for European application No. 11872391.5, dated Jul. 16, 2015, 15 pages.
Partial Supplementary European Search Report for European application No. 11872391.5, dated Mar. 27, 2015, 7 pages.
Knut Langhans et al., "Solid Felix: A Static Volume 3D-Laser Display", Proceedings of SPIE, vol. 5006, May 29, 2003, 14 pages.
Refai H.H., "Static Volumetric Three-Dimensional Display", Journal of Display Technology, IEEE Service Center, New Nork, NY, US, vol. 5, No. 10, Oct. 31, 2009, pp. 391-397, XP011278042, 7 pages.
English Translation of Notice of Reasons for Rejection for JP 2014-530635, dated Apr. 28, 2015, 2 pages.
Chinese Office Action and Search Report for CN 2011-800734758, dated Apr. 29, 2015, 7 pages.
Notice of Preliminary Rejection for KR 10-2014-7008042, dated May 26, 2015, 3 pages.
Second Office Action and Search Report for Chinese Patent Application No. 2011-800734758, dated Feb. 2, 2016, 3 pages.
Notice of Preliminary Rejection for Korean application No. 10-2014-7008042, dated Nov. 11, 2015, 3 pages.

* cited by examiner

FIG. 6 ved herein.
HOLOGRAPHIC DISPLAY SYSTEMS AND METHODS HAVING ELLIPOSIDIAL ARRANGMENT OF DMD ARRAYS EMITTING INFRARED LASER RADIATION

BACKGROUND

Conventional 3D displays usually provide views of a 3D scene for a fixed single position. Those 3D displays that permit viewing from multiple positions and can hence be termed holographic tend to suffer from limited 3D resolution and the viewing experience tends to change from one view to another. Conventional 3D volumetric displays, such as those that project 2D images onto rotating screens or that project images onto water vapor and so forth, tend to suffer from various shortcomings with respect to occlusion, depth of view, distorted field of view, and the like.

Various approaches have been taken in an attempt to provide a truly holographic mid-air display. Some approaches use rotating mirrors and a laser to project low resolution 3D holographic images by ionizing air, while yet others use a special medium such as vapor saturated gas to support the images. One of the major challenges currently has been to make high resolution 3D holographic displays viable in mid-air without the need for delicate mechanical parts such as rotating Galvanometric mirrors and the like, or without requiring a special medium to support the display.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

One or more embodiments are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such system-on-a-chip (SoC) architectures for example, implementation of the techniques and/or arrangements described herein are not restricted to particular architectures and/or computing systems and may implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one embodiment", "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Figure 1:
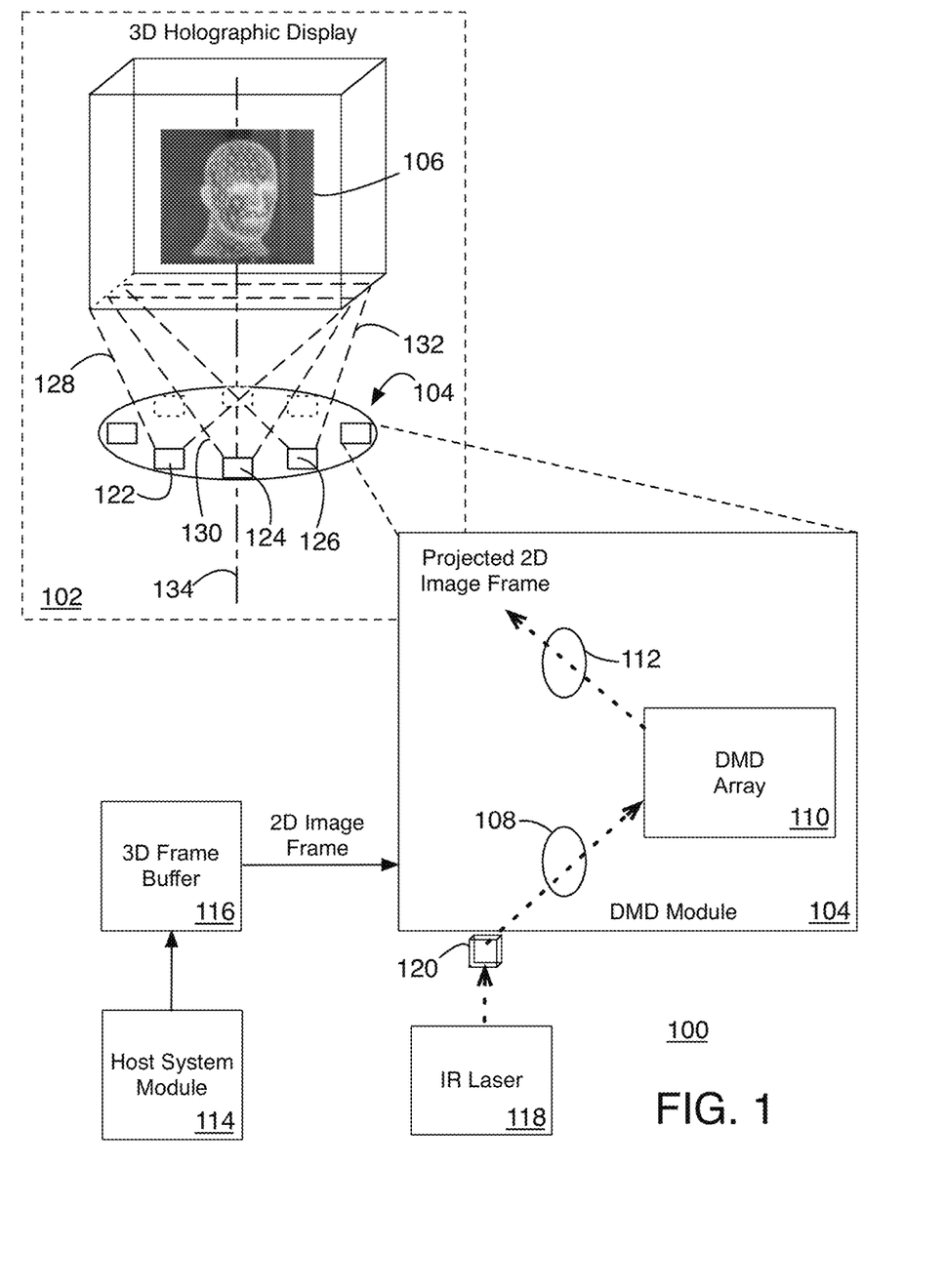
FIG. 1 is an illustrative diagram of an example system.

FIG. 1 illustrates an example 3D holographic projection system 100 in accordance with the present disclosure. System 100 includes a 3D holographic projection display assembly 102 including one or more Digital Micromirror Device (DMD) devices or modules 104, where each module 104 is configured to provide mid-air projection of a 2D image frame or slice of a 3D holographic image 106. Each DMD module 104 includes at least a relay lens 108, a DMD array 110, and a projection lens 112. System 100 also includes a host system module 114, a 3D frame buffer 116, an infrared (IR) laser 118, and a beam splitter 120. In various implementations, system 100, or portions thereof, may be included as at least part of a SoC architecture implemented in a CE system or device.

As will be explained in greater detail below, system 100 may be used to project 2D image frames or slices to create 3D holographic image 106. For example, as shown here, individual DMD modules 122, 124 and 126 may be configured to spatially modulate IR laser radiation (received from laser 118 via beam splitter 120) in order to project respective 2D image frames or slices 128, 130 and 132 that form at least a portion of image 106. Each 2D image frame may be specified by host system module 114, stored in 3D frame buffer 116, and conveyed to a corresponding one of DMD modules 104. In various implementations, IR laser 118 may provide IR laser light, in either pulsed or Continuous Wave (CW) beam form, to beam splitter 120 where the laser light may be split into as many individual laser beams as needed to provide an individual IR laser beam to each DMD module 104. Within each DMD module 104, relay lens 108 conveys the corresponding IR laser beam to DMD array 110 so that the array may be used in conjunction with projection lens 112 to project a 2D image frame in mid-air thereby creating, at least in part. 3D holographic image 106.

As will be explained in greater detail below, each projected 2D image frame may include a 2D array of volumetric image positions or voxels each specifying a different 3D location (e.g., x, y, and z(depth)) in image 106. Each DMD module 104 may act to spatially modulate and focus the IR laser light to cause ionization of atmospheric gases at various voxel locations to form a voxel array as specified by the 2D image frame data obtained from buffer 116. In addition, in accordance with the present disclosure, the positioning of the 2D image frames or voxel arrays within 3D holographic display 102 may be changed periodically to facilitate ionization. For example, as will be explained in greater detail below, the 2D image frames or voxel arrays forming holographic image 106, and hence holographic image 106 itself, may be rotated in space about, for example, a rotational axis 134, so that, from frame to frame, different gas parcels or volumes are ionized at the voxel positions. For example, a voxel array forming an image slice of a 3D image may be rotated about axis 134 so that the array is radially displaced by about one degree for every instance of projection. In other implementations, having different ones of modules 104 act to project slice 128 on subsequent projections may result in rotation of a voxel array, such as slice 128, in mid-air.

In various implementations, DMD modules 104 may be spaced equidistant from each other in an ellipsoidal arrangement about vertical axis 134. In some implementations, holographic image 106 may occupy a volume of approximately 20 centimeters (cm) by 15 cm by 12 cm (height-.times.width.times.depth) and may be produced by a total of eight (8) DMD modules 104, each module 104 projecting one of eight 2D images or image slices providing a total of at least eight million voxels available to form image 106. Where the plurality of DMD arrays may includes eight or more DMD arrays (e.g., 122, 124 and 126) that are spaced equidistant from each other in a spaced arrangement that defines an ellipsoid around an axis of rotation 134, where the axis of rotation 134 is perpendicular to the ellipsoidal arrangement. The plurality of DMD arrays (e.g., 122, 124 and 126) may project a 3D image 106 where each one of the plurality of DMD arrays projects a parallel 2D slice portion (e.g., 128, 130 and 132) of the 3D image 106.

DMD systems and arrays including associated logic, optics and so forth are known in the art. For example, see Texas Instruments Application Report, "Single-Panel DLP™ Projection System Optics" (March 2005) and "DLP Pico Projector Development Kit v2" (Literature No. DLPU003A, revised December 2010). In addition, the use of DMD systems and/or arrays to spatially modulate radiation to project 2D images is known in the art. For example, see Texas Instruments Application Reports, "DLPC200 API Programmer's Guide" (March 2011) and "Using the DLP Pico 2.0 Kit for Structured Light Applications" (January 2010). "DLP Pico Chipset v2 Programmer's Guide" (Literature No. DLPU002A, revised July 2010), as well as "Using DLP: Development Kits for 3D Optical Metrology Systems," Texas Instruments Application Report DLPA026 (May 2011).

Those of skill in the art will recognize that system 100, 3D holographic display 102, and DMD module 104 may include additional items that have not been depicted in FIG. 1 in the interests of clarity. For example, display 102 may include physical support elements, logic associated with DMD modules 104, and so forth. Further, each DMD module 104 may include logic, electrical interconnect systems, physical support structures, communications systems and the like. Description of various components of system 100 will be provided in greater detail below in discussion of FIGS. 2-4. Further, in various implementations, and as will be described in greater detail below with respect to FIG. 3, system 1100 may include a laser diode (not shown in FIG. 1) located between DMD array 110 and projection optics 112 that is configured to be pumped by patterned laser light (from laser 118) provided by DMD array 110.

Figure 2:
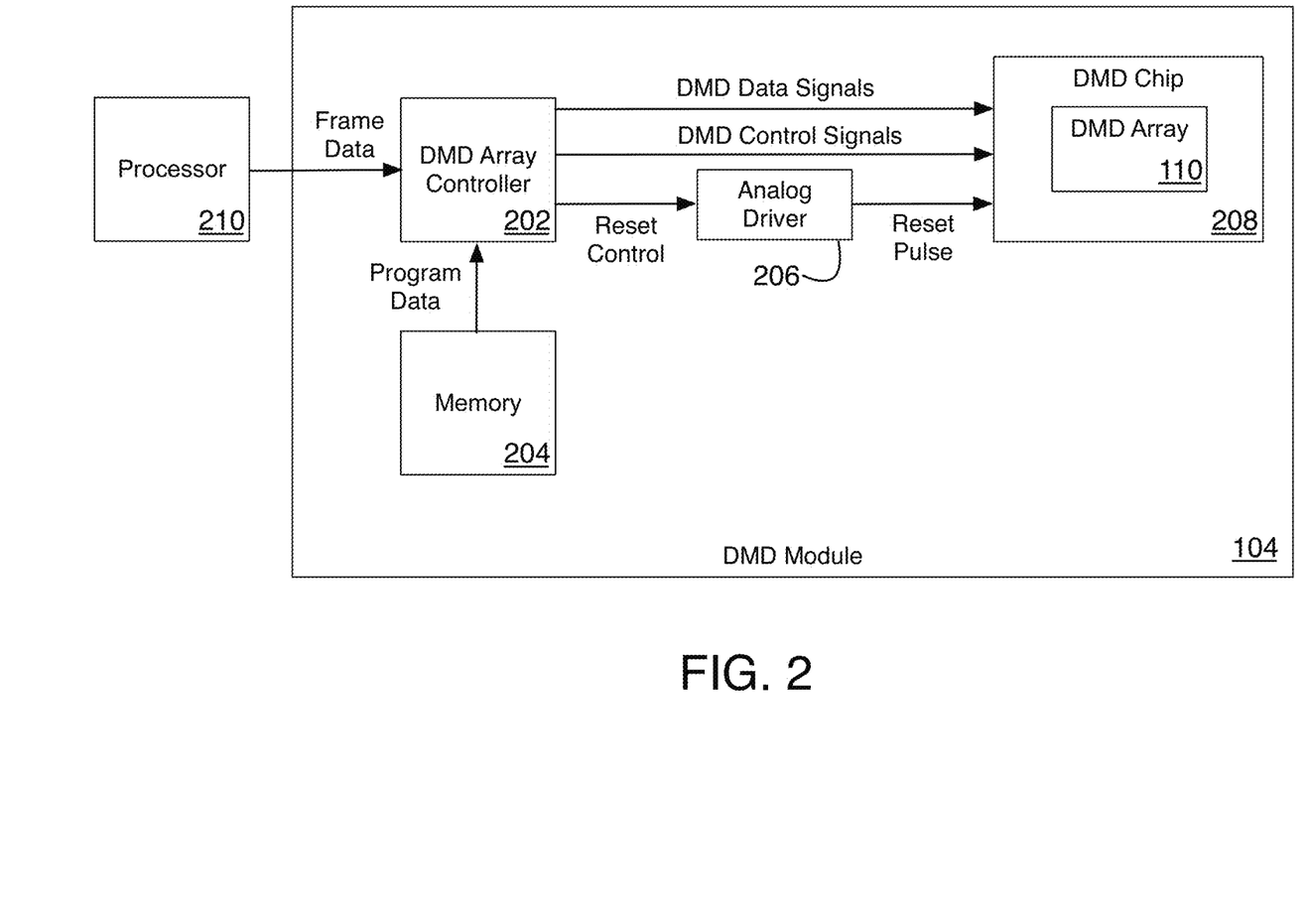
FIG. 2 illustrates an example device.

FIG. 2 illustrates portions of an example DMD device or module 104 of system 100 in accordance with the present disclosure. DMD Module 104 includes a DMD array controller 202, memory 204, analog driver 206, and a DMD chip or Integrated Circuit (IC) 208 including a DMD array 110. In accordance with the present disclosure, controller 202 may use 2D image frame data, or data derived from the 2D image frame, in addition to program data obtained from memory 204 to control DMD array 110 and to cause it to spatially modulate and focus IR laser light to form holographic images. To do so, array controller 202 may provide DMD data and control signals to DMD chip 208. Controller 202 may also provide a reset control signal to analog driver 206 to initiate a reset pulse applied to DMD chip 208. In operation, controller 202 may use the program data to adjust the DMD data and control signals in a manner that causes DMD array 210 to spatially modulate the laser radiation as specified by the frame data. The frame data may be supplied by a processor 210 having one or more processor cores where the processor may have obtained the frame data from a frame buffer (not shown). Alternatively, the frame data may be obtained from a frame buffer by controller 202. While FIG. 2 illustrates processor 210 as separate from DMD module 104 such that processor 210 may supply data for separate 2D image frames to multiple DMD modules 104 as shown in FIG. 1, in various other implementations, processor 210 may be part of DMD module 104.

In various implementations, DMD array 110 may include a rectangular array of MicroElectroMechanical Systems (MEMS)-based spatial light modulators providing XGA (e.g., a 1024×768 array of modulators), WXGA, SXGA+, or 1080p image/pattern resolution, to name a few non-limiting examples. In addition, data transfer speeds between controller 202 and array 110 may be suitable for Low-Voltage Differential Signaling (LVDS) techniques. Further, the data input to chip 208 may be synchronized with timing information provided to driver 206 to enable the resetting of chip 208.

Figure 3:
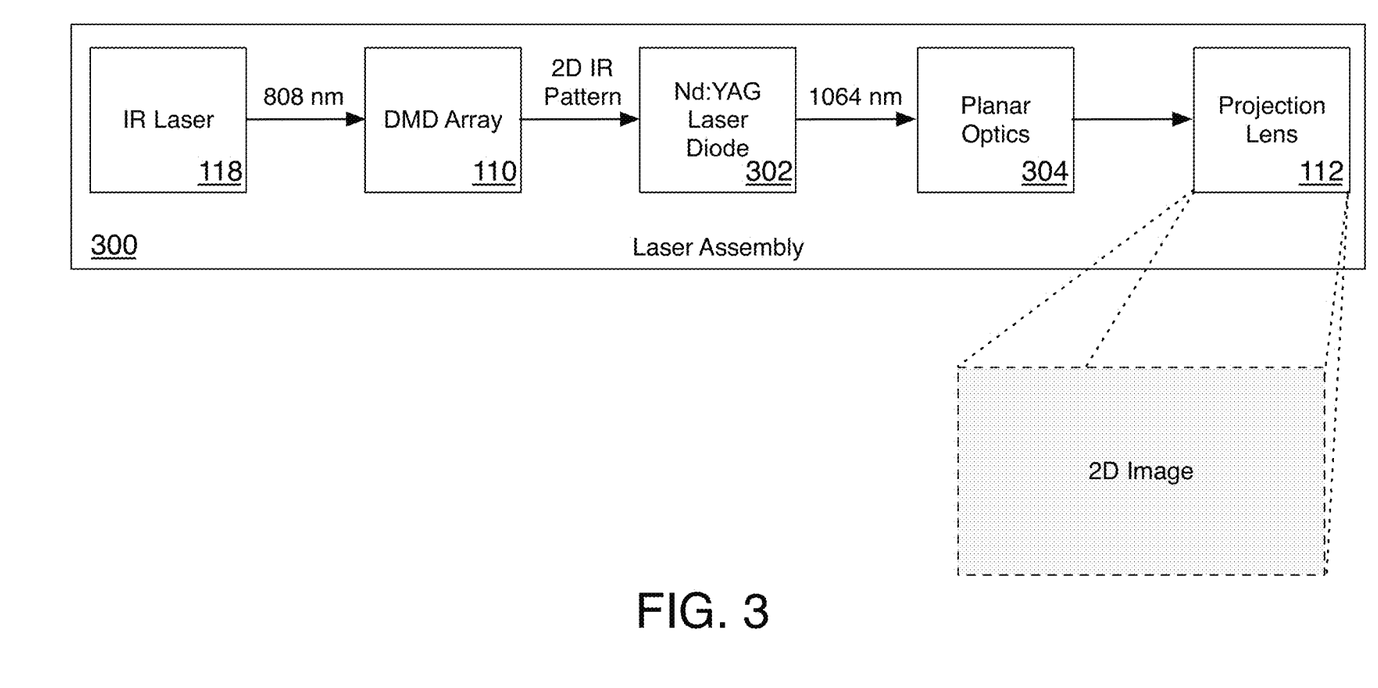
FIG. 3 illustrates an example device.

FIG. 3 illustrates portions of an example laser device 300 in accordance with the present disclosure where device 300 includes example items 110, 112 and 118 of system 100. Laser device 300 includes laser 118 providing IR laser radiation (e.g., 808 nanometer (nm) laser radiation) to DMD array 110. In some implementations, IR laser 118 may provide from 200-2,000 milliwatts (mW) of laser radiation to DMD array 110. Beam splitter 120 and relay lens 108 of FIG. 1 have not been depicted in FIG. 3 in the interest of clarity. Under control of various schemes as described herein. DMD array 110 may reflect the 808 nanometer laser light to supply a spatially modulated 2D IR pattern to a Neodymium-doped Yttrium Aluminum Garnet (Nd:YAG) laser diode 302.

Laser diode 302 may include any commercially available Nd:YAG laser crystal having, for example, an input face or surface coated with dielectric material such that the input surface has high reflectivity with respect to 1064 nm light and has high transmissivity with respect to 808 nm light, while having an output surface coated such that it has an anti-reflective characteristic with respect to 1064 nm light. In some implementations, Nd:YAG laser diode 302 may be coupled to an acousto-optic modulator (not shown) and/or may be operated as a Q-switched laser. Upon being optically pumped by the 2D IR pattern, Nd:YAG laser diode 302 may generate a lower frequency (1064 nm), higher power pulsed 2D IR pattern provided to planar optics 304. Projection lens 112 may then project and focus the lower frequency 2D IR pattern into space adjacent to device 300 to create a 2D image frame by selectively ionizing parcels of air to form a voxel array as described herein.

Those of skill in the art may recognize that DMD array 110 may be controlled such that the 2D pattern it projects on Nd:YAG laser diode 302 may include fringe patterns of focal spots whose planar optical paths have been predetermined by, for example, processor 210 of FIG. 2, to result in chirp amplification by Nd:YAG laser diode 302. For example, chirp amplification by Nd:YAG laser diode 302 of input fringe patterns may result in a diode current in laser diode 302 of several kilo amperes (kA) and pulsed output (e.g., having pulse durations of 1-100 nanoseconds) of the lower frequency (1064 nm) 2D IR pattern on the order of several megawatts (MW) sufficient to cause ionization of atmospheric gases. In various implementations, disruptive heating of DMD array 110 may be avoided by using expansion optics (not shown) to expand the IR laser light supplied to DMD array 110. Alternatively. DMD array 110 may be cryogenically cooled using, for example, a Peltier thermoelectric device (also not shown) to forestall thermal runway of laser diode 302 when activated, for example, by a 2.2V saturation pulse. In various implementations, a resistor may be used to limit the diode current in Nd:YAG laser diode 302.

In various implementations, device 300 may include additional components not illustrated in FIG. 3 in the interest of clarity. For example, device 300 may include laser diode stabilizer logic to provide, for example, laser diode reference pulses ("time-to-fire", blanking, rasterizing, etc.), optical blanking data from a microcontroller driving a chirp-amplification timer, power-up and power-down requests, and so forth. Further, while laser diode 118 is shown as providing 808 nm light to DMD array 110, different laser diodes generating different laser wavelengths may be used to provide laser radiation to DMD array 110 and Nd:YAG laser diode 302.

In various implementations, multiple DMD arrays may be grouped together in a DMD module to provide increased resolution. For example, a single DMD with a 1024 by 768 array of 17-μm mirrors may project an image with a 29.4-mrad size and a 0.0383-mrad spatial resolution (using standard digital-image-processing calculations for 500-nm light and shortest array length). A square grouping of eight of these devices, however, may produce an image with a 0.3031-mrad spatial resolution. Further, employing different DMD mirror dimensions may be also improve resolution. For example, a single 1024 by 768 DMD array having 13-μm mirrors may project an image with 38.5-mrad size and 0.050-mrad resolution, while employing a square-shaped arrangement of eight of these devices may result in an improved 0.45-mrad resolution.

In various implementations, beam splitter loss (at, e.g., beam splitter 120) may be reduced by selecting the beam splitter's reflectance/transmittance ratio to minimize differences in intensity of the various light paths generated as output by the beam splitter. Further, beam splitter loss may also be reduced by attenuating all rendering according to one of three viewport-specific factors: 0.365 (near image), 0.615 (mid image), and 1.000 (far image). In addition, in various implementations, stray 1064 nm light may be controlled by employing dielectric-coated optical elements (e.g., coated mirrors with high reflectivity (HR) with respect to 1064 nm light and/or with anti-reflective (AR) characteristic with respect to 808 nm light) adjacent to the optical pathway between the laser module and the DMD array(s).

Figure 4:
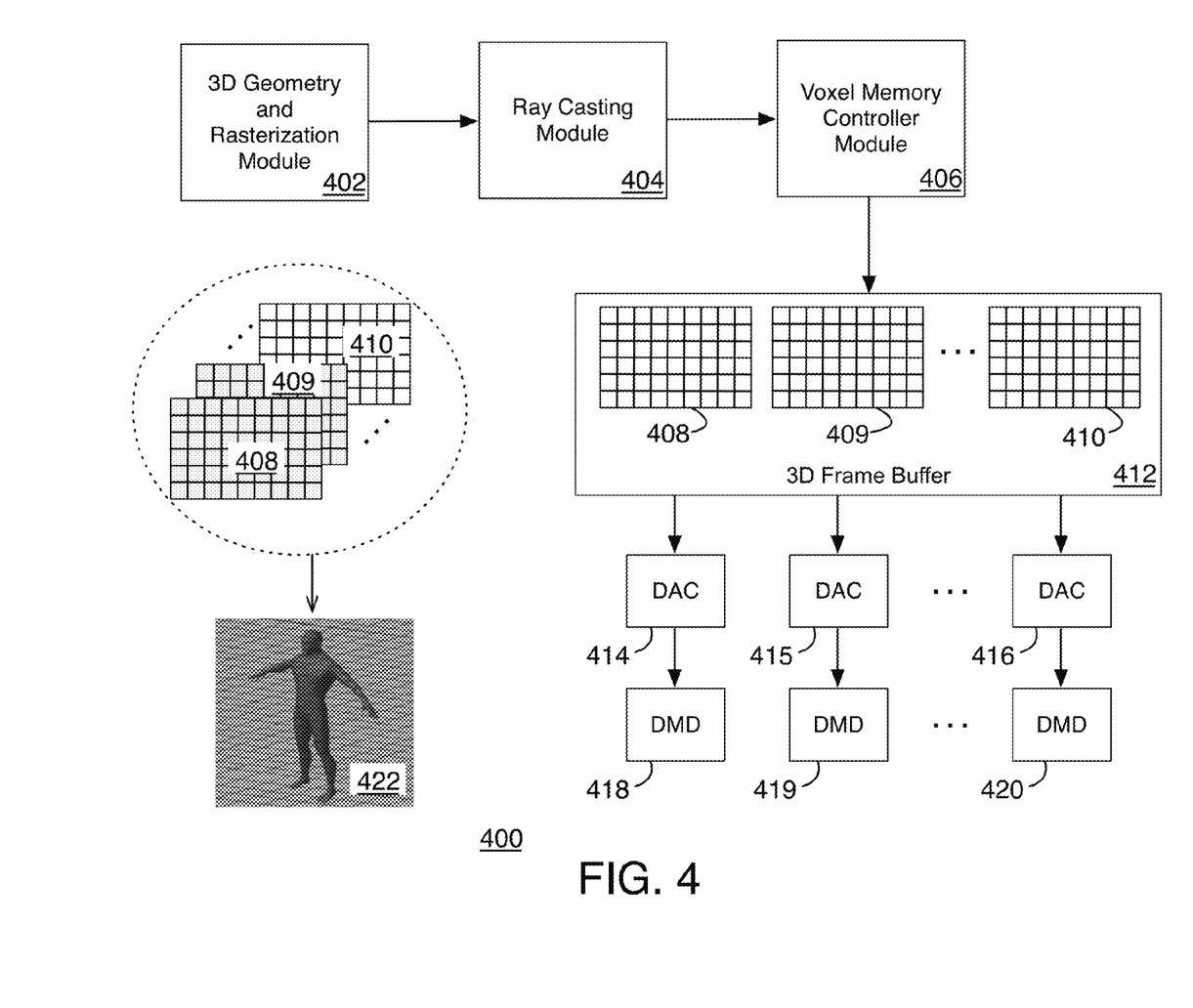
FIG. 4 illustrates an example 3D pipeline.

FIG. 4 illustrates portions of an example holographic pipeline 400 in accordance with the present disclosure. As will be described in further detail below, pipeline 400 may include some known components of a 3D rendering pipeline that may be used to generate 3D scene data including vertices, pixels and so forth, using fixed function and/or programmable hardware units. For example, pipeline 400 includes a 3D geometry and rasterization module 402 coupled to a ray casting module 404 that may largely implement well known 3D rendering techniques. Pipeline 400 also includes a voxel memory controller module 406 that receives 3D image data from ray casting module 404 and that processes that 3D data to provide multiple 2D image frames 408, 409 and 410 stored in a 3D frame buffer 412. Each of the 2D image frame stored in a buffer 412 may be provided to a different one of a corresponding number of Digital-to-Analog Converters (DACs) 414, 415, and 416. In turn, each of DACs 414, 415 and 416 may provide an analog version of the 2D image frame data to a corresponding one of a number of DMD modules 418, 419 and 420 (e.g., that may correspond to DMD modules 104 of system 100). As discussed above with respect to system 100, each of the 2D image frames 408, 409 and 410 may correspond to different 2D image slices of a holographic 3D image 422.

In various implementations, pipeline 400 or portions thereof may be implemented as at least part of a holographic image system or voxel engine that can generate volume information specifying voxels. A programming module in accordance with the present disclosure may include a 3D Application Programming Interface (API) running on a voxel engine that renders all vertices to be displayed via a 3D viewport. For example, OpenGL 4.1 (see, e.g., Segal and Akeley, "The OpenGL Graphics System: A Specification (Ver. 4.1 (Core Profile)—Jul. 25, 2010)") may be employed and the associated functionality of a Viewport Array (VA) may define a number of viewports that the rendering engine will support.

3D geometry and rasterization module 402 may determine the transformation of a 3D geometry in model space into a 3D scene in screen space corresponding to the volume in which the 3D holographic image will be formed. Module 402 may implement known 3D rendering techniques to calculate vertices and to clip vertices whose coordinates are outside the viewing volume of the display. Known clipping techniques may be applied over a volume based on whether objects being rendered are either entirely in the screen space, partially in the space or outside the screen space.

Ray casting module 404 may then apply known ray casting techniques to apply lighting and/or shading to objects that are viewable in the screen space as well as to remove hidden surfaces and so forth. Module 404 may also undertake known depth filtering or testing schemes. In addition, module 404 may apply anti-aliasing processing both with respect to pixels in each 2D image frame and with respect to effects associated with the depths of the voxels. In various implementations, ray casting module 404 may employ known techniques to generate voxel shading information and various accelerating algorithms such as BSP Octrees, kd-trees and the like to generate voxel data. As a result of processing by modules 402 and 404, world space coordinates of objects in a scene may be converted into viewport specific screen space coordinates.

Voxel memory controller module 406 may then directly write the voxel information specifying the pixels for each 2D image frame into frame buffer 412, including information regarding relative positioning (e.g., window positioning) of the image frames, pixel transparency, pixels generated for anti-aliasing, and so forth. Module 406 may determine the address in frame buffer 412 to which voxel values may be written. Prior to writing data to frame buffer 412, module 406 may modify or otherwise format the 2D image data to conform with display parameters such as screen resolution, refresh frequency, and the like. In various implementations, voxel data may be stored dynamically as various 2D image frames depending upon the viewport and visibility. Further, in various implementations, an OpenGL buffer may be partitioned to form frame buffer 412 where each voxel may have a fixed depth that may be a function of a specific DMD array's focal point.

In various implementations, to display different views of a holographic 3D image in real time, to, for example, rotate voxel arrays forming a 3D image, it may be necessary to display a large number of different images at a high frame rate. For example, as many as 6,000 frames per second may be displayed using systems in accordance with the present disclosure such as system 100 of FIG. 1. To enable rapid frame rate processing as well as rotation of the resulting 3D image, each voxel may be stored as a set of data including its depth coordinate and the coordinates for display location according to a reference view. Subsequent images may then be reconstructed for new views or frames by copying the voxel data to a new location based on the initial position of the pixel in the reference view, shifted according to its depth and the new view to be reconstructed.

When preparing voxel data for storage in frame buffer 412, module 406 may employ algorithms in accordance with the present disclosure to reduce memory usage and expedite voxel data processing. For instance, each screen in display space may be divided into lines of voxels having a same depth represented by a discretized signed distance between the voxel and the screen. Each line may be composed of planes that contain at least one voxel. Empty planes may not be coded to reduce memory use. Inside planes, voxels may be grouped in patterns of horizontal sets of contiguous voxels that are stored from left to right and do not overlap each other. For instance, data components of each voxel (e.g., red intensity, green intensity, blue intensity and transparency) may be stored in frame buffer 412 according to the following algorithm:

---

{For each plane of a display space screen (number of planes and voxel depth fixed)
    For Each Line on the Plane
        For Each Voxel on the Plane
            Apply Ray Casting for each Voxel illumination
            Determine Visibility Based on Hidden Voxel Algorithm
        End For
    End For
End For}

---

Figure 5:
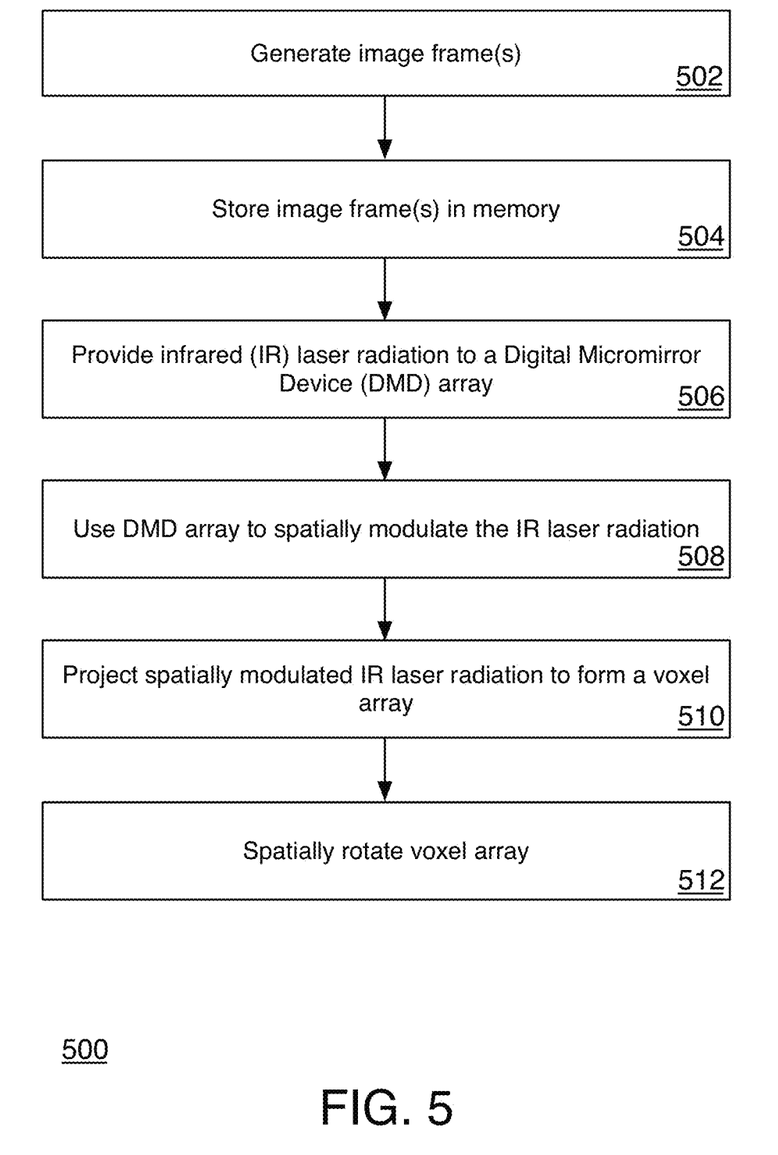
FIG. 5 illustrates an example process.

FIG. 5 illustrates a flow diagram of an example process 500 according to various implementations of the present disclosure. Process 500 may include one or more operations, functions or actions as illustrated by one or more of blocks 502, 504, 506, 508, 510 and 512 of FIG. 5. By way of non-limiting example, process 500 will be described herein with reference to the example systems and/or devices of FIGS. 1-4. Process 500 may begin at block 502.

At block 502, an image frame may be generated and, at block 504, the image frame may be stored in memory. For example, referring to FIG. 4, modules 402 and 404 may undertake block 502 for a 2D image frame or slice of a 3D image, while module 406 may undertake block 504 by storing the 2D image frame in frame memory 412. At block 506, IR laser radiation may be provided to a DMD array. For example, referring to FIG. 1, block 506 may involve providing IR laser radiation from laser 118 to DMD array 110 via beam splitter 120 and relay lens 108.

At block 508, the DMD array may be used to spatially modulate the IR laser radiation. For instance, referring to FIG. 2, block 508 may involve controller 202 using frame data derived from the image frame to operate DMD array 110 so that the IR laser radiation is spatially modulated in a manner to facilitate display of the image frame. The spatially modulated IR laser radiation is then projected at block 510 to form a voxel array. For example, referring to FIG. 1, the spatially modulated IR laser radiation may be projected by DMD module 104 to form an array of voxels representing one of 3D image slices 128, 130 or 132. Process 500 may conclude at block 512 with rotation of the voxel array as described above with respect to FIG. 1.

While the implementation of example process 500, as illustrated in FIG. 5, may include the undertaking of all blocks shown in the order illustrated, the present disclosure is not limited in this regard and, in various examples, implementation of process 500 may include the undertaking only a subset of all blocks shown and/or in a different order than illustrated. In addition, any one or more of the blocks of FIG. 5 may be undertaken in response to instructions provided by one or more computer program products. Such program products may include signal bearing media providing instructions that, when executed by, for example, one or more processor cores, may provide the functionality described herein. The computer program products may be provided in any form of computer readable medium. Thus, for example, a processor including one or more processor core(s) may undertake one or more of the blocks shown in FIG. 5 in response to instructions conveyed to the processor by a computer readable medium.

Figure 6:
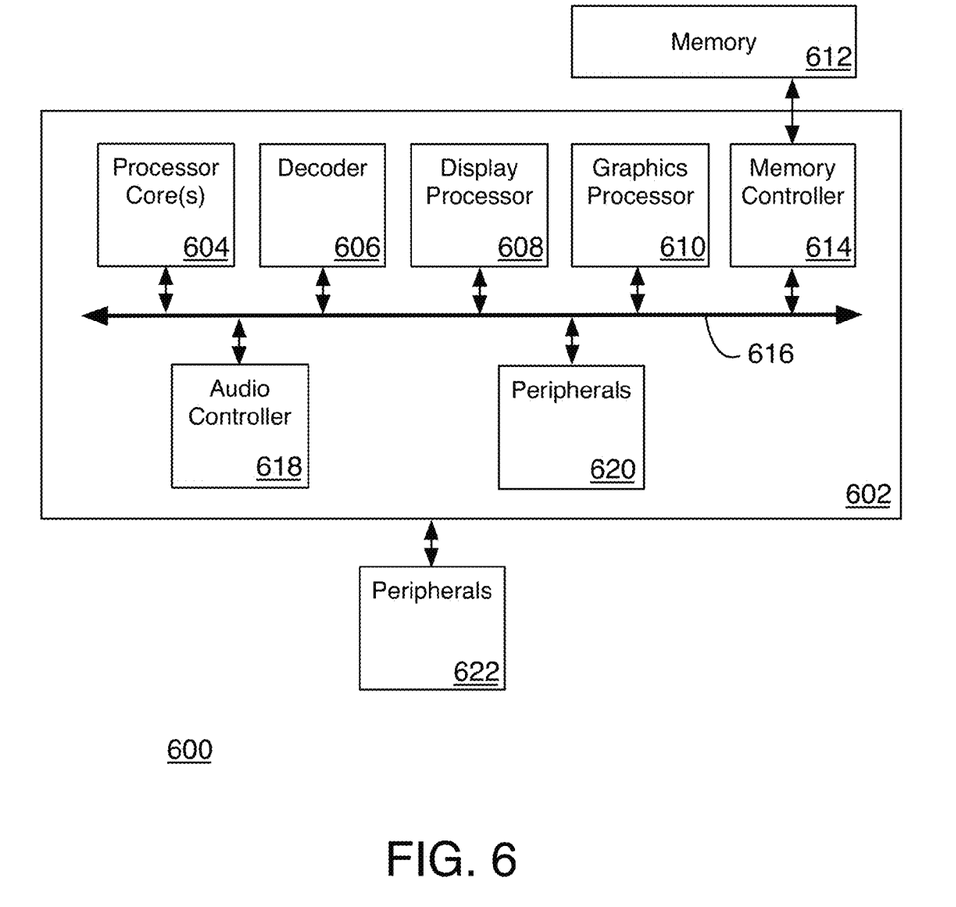
FIG. 6 is an illustrative diagram of an example system, all arranged in accordance with at least some implementations of the present disclosure.

FIG. 6 illustrates an example system 600 in accordance with the present disclosure. System 600 may be used to perform some or all of the various functions discussed herein and may include any device or collection of devices capable of implementing 3D holographic projection displays in accordance with various implementations of the present disclosure. For example, system 600 may include selected components of a computing platform or device such as a desktop, mobile or tablet computer, a smart phone, a set top box, etc., although the present disclosure is not limited in this regard. In some implementations, system 600 may be a computing platform or SoC based on Intel® architecture (IA) for CE devices. It will be readily appreciated by one of skill in the art that the implementations described herein can be used with alternative processing systems without departure from the scope of the present disclosure.

System 600 includes a processor 602 having one or more processor cores 604. Processor cores 604 may be any type of processor logic capable at least in part of executing software and/or processing data signals. In various examples, processor cores 604 may include CISC processor cores, RISC microprocessor cores, VLIW microprocessor cores, and/or any number of processor cores implementing any combination of instruction sets, or any other processor devices, such as a digital signal processor or microcontroller.

Processor 602 also includes a decoder 606 that may be used for decoding instructions received by, e.g., a display processor 608 and/or a graphics processor 610, into control signals and/or microcode entry points. While illustrated in system 600 as components distinct from core(s) 604, those of skill in the art may recognize that one or more of core(s) 604 may implement decoder 606, display processor 608 and/or graphics processor 610. In some implementations, processor 602 may be configured to undertake any of the processes described herein including the example process described with respect to FIG. 5. Further, in response to control signals and/or microcode entry points, decoder 606, display processor 608 and/or graphics processor 610 may perform corresponding operations.

Processing core(s) 604, decoder 606, display processor 608 and/or graphics processor 610 may be communicatively and/or operably coupled through a system interconnect 616 with each other and/or with various other system devices, which may include but are not limited to, for example, a memory controller 614, an audio controller 618 and/or peripherals 620. Peripherals 620 may include, for example, a unified serial bus (USB) host port, a Peripheral Component Interconnect (PCI) Express port, a Serial Peripheral Interface (SPI) interface, an expansion bus, and/or other peripherals. While FIG. 6 illustrates memory controller 614 as being coupled to decoder 606 and the processors 608 and 610 by interconnect 616, in various implementations, memory controller 614 may be directly coupled to decoder 606, display processor 608 and/or graphics processor 610.

In some implementations, system 600 may communicate with various I/O devices not shown in FIG. 6 via an I/O bus (also not shown). Such I/O devices may include but are not limited to, for example, a universal asynchronous receiver/transmitter (UART) device, a USB device, an I/O expansion interface or other I/O devices. In various implementations, system 600 may represent at least portions of a system for undertaking mobile, network and/or wireless communications.

System 600 may further include memory 612. Memory 612 may be one or more discrete memory components such as a dynamic random access memory (DRAM) device, a static random access memory (SRAM) device, flash memory device, or other memory devices. While FIG. 6 illustrates memory 612 as being external to processor 602, in various implementations, memory 612 may be internal to processor 602. Memory 612 may store instructions and/or data represented by data signals that may be executed by processor 602 in undertaking any of the processes described herein including the example process described with respect to FIG. 5. In some implementations, memory 612 may include a system memory portion and a display memory portion and may provide a 3D frame buffer in accordance with the present disclosure.

The devices and/or systems described herein, such as example devices and/or systems 100, 200, 300 and/or 400 represent several of many possible device configurations, architectures or systems in accordance with the present disclosure. Numerous variations of systems such as variations of example systems 100, 200, 300 and/or 400 are possible consistent with the present disclosure.

The systems described above, and the processing performed by them as described herein, may be implemented in hardware, firmware, or software, or any combination thereof. In addition, any one or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed:

1. A system, comprising:
   a plurality of Digital Micromirror Device (DMD) arrays; and
   at least one laser module to provide infrared (IR) laser radiation to the plurality of DMD arrays;
   wherein each DMD is configured to spatially modulate the IR laser radiation so that an image frame is projected as a voxel array, wherein each voxel of the voxel array corresponds to a volume of air wherein the IR laser radiation is to be focused sufficiently to cause air to ionize, and
   wherein the plurality of DMD arrays are configured to spatially rotate the voxel array based at least in part on having different individual DMD arrays alternately project the image frame;
   wherein the plurality of DMD arrays includes eight or more DMD arrays that are spaced equidistant from each other in a spaced arrangement that defines an ellipsoid around an axis of rotation, each of the eight or more DMD arrays having a rectangular shape including hundreds of pixels in a first direction and hundreds of pixels in a second direction, where the axis of rotation is perpendicular to the ellipsoidal arrangement, wherein the plurality of DMD arrays project a 3D image where each one of the plurality of DMD arrays projects a parallel 2D slice portion of the 3D image;
   wherein each DMD array is configured to spatially modulate the IR laser radiation so that a different image frame of a plurality of image frames is projected as one of a plurality of voxel arrays.

2. The system of claim 1, further comprising:
   one or more processor cores to specify the image frame; and
   a frame buffer to store the image frame.

3. The system of claim 1, further comprising:
   a Neodymium-doped Yttrium Aluminum Garnet (Nd:YAG) laser diode to receive the spatially modulated IR laser radiation from the DMD array.

4. The system of claim 1, further comprising at least one controller coupled to the plurality of DMD arrays, the controller to receive data corresponding to the image frame and to control each DMD array in response to the data.

5. The system of claim 1, wherein plurality of DMD arrays are arranged together to spatially modulate the IR laser radiation.

6. A method, comprising:
providing infrared (IR) laser radiation to at least one of a plurality of Digital Micromirror Device (DMD) arrays;
using at least one of the plurality of DMD arrays to spatially modulate the IR laser radiation;
projecting the spatially modulated IR laser radiation to form a voxel array, wherein each voxel of the voxel array corresponds to a volume of air wherein the IR laser radiation has been focused sufficiently to cause air to ionize; and
spatially rotating the voxel array based at least in part on having different individual DMD arrays of the plurality of DMD arrays alternately project the image frame;
wherein the plurality of DMD arrays includes eight or more DMD arrays that are spaced equidistant from each other in a spaced arrangement that defines an ellipsoid around an axis of rotation, each of the eight or more DMD arrays having a rectangular shape including hundreds of pixels in a first direction and hundreds of pixels in a second direction, where the axis of rotation is perpendicular to the ellipsoidal arrangement wherein the plurality of DMD arrays project a 3D image where each one of the plurality of DMD arrays projects a parallel 2D slice portion of the 3D image;
wherein each DMD array is configured to spatially modulate the IR laser radiation so that a different image frame of a plurality of image frames is projected as one of a plurality of voxel arrays.

7. The method of claim 6, further comprising:
receiving the spatially modulated IR laser radiation at a laser diode; and
using the laser diode to generate second spatially modulated IR laser radiation having a longer wavelength than a wavelength of the spatially modulated IR laser radiation from the laser diode, wherein projecting the spatially modulated IR laser radiation comprises projecting the spatially modulated IR laser radiation having the longer wavelength.

8. The method of claim 6, further comprising:
generating an image frame, wherein using each DMD array to spatially modulate the IR laser radiation comprises using each DMD array to spatially modulate the IR laser radiation in response to the image frame.

9. The method of claim 8, further comprising:
storing the image frame in a frame buffer.

10. The method of claim 6, further comprising:
providing the IR laser radiation to a second DMD array of the plurality of DMD arrays;
using the second DMD array to second spatially modulate the IR laser radiation; and
projecting the second spatially modulated IR laser radiation to form a second voxel array spaced apart from the first voxel array.

11. The method of claim 10, further comprising:
generating first and second image frames, wherein using the at least one DMD array to spatially modulate the IR laser radiation comprises using the at least one DMD array to spatially modulate the IR laser radiation in response to the first image frame, and wherein using the second DMD array to second spatially modulate the IR laser radiation comprises using the second DMD array to spatially modulate the IR laser radiation in response to the second image frame.

12. The method of claim 11, further comprising:
storing the first and second image frames in a frame buffer.

* * * * *